A. R. WYLIE & J. G. WRIGHT.
VEHICLE WHEEL.
APPLICATION FILED MAR. 14, 1911.

1,026,292.

Patented May 14, 1912.

Alfred R. Wylie.
James G. Wright.
INVENTORS

BY
ATTORNEY

WITNESSES:

UNITED STATES PATENT OFFICE.

ALFRED R. WYLIE AND JAMES G. WRIGHT, OF BIG SPRING, TEXAS.

VEHICLE-WHEEL.

1,026,292.  Specification of Letters Patent.  Patented May 14, 1912.

Application filed March 14, 1911. Serial No. 614,364.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Vehicle-Wheels, of which the following is a specification.

Our invention relates to new and useful improvements in vehicle wheels, and relates more particularly to certain improvements upon the vehicle wheel covered by the applicants' co-pending application, filed November 27, 1910, under Serial Number 584,032.

The object of the invention is to provide a vehicle wheel, employing a plurality of radially mounted coiled springs, through which shocks received at the rim are transmitted with reduced force to the central hub, thus making pneumatic tires unnecessary, and eliminating the expense and annoyance which they occasion.

Another object of our invention consists in the provision of a plurality of radial flat springs, through which rotation is communicated from the central hub to the rim of the wheel and vice-versa.

Further objects lie in the provision of certain specific improvements over the construction covered in the patent application above mentioned, said improvements being fully described and explained in the following specification.

Figure 1:
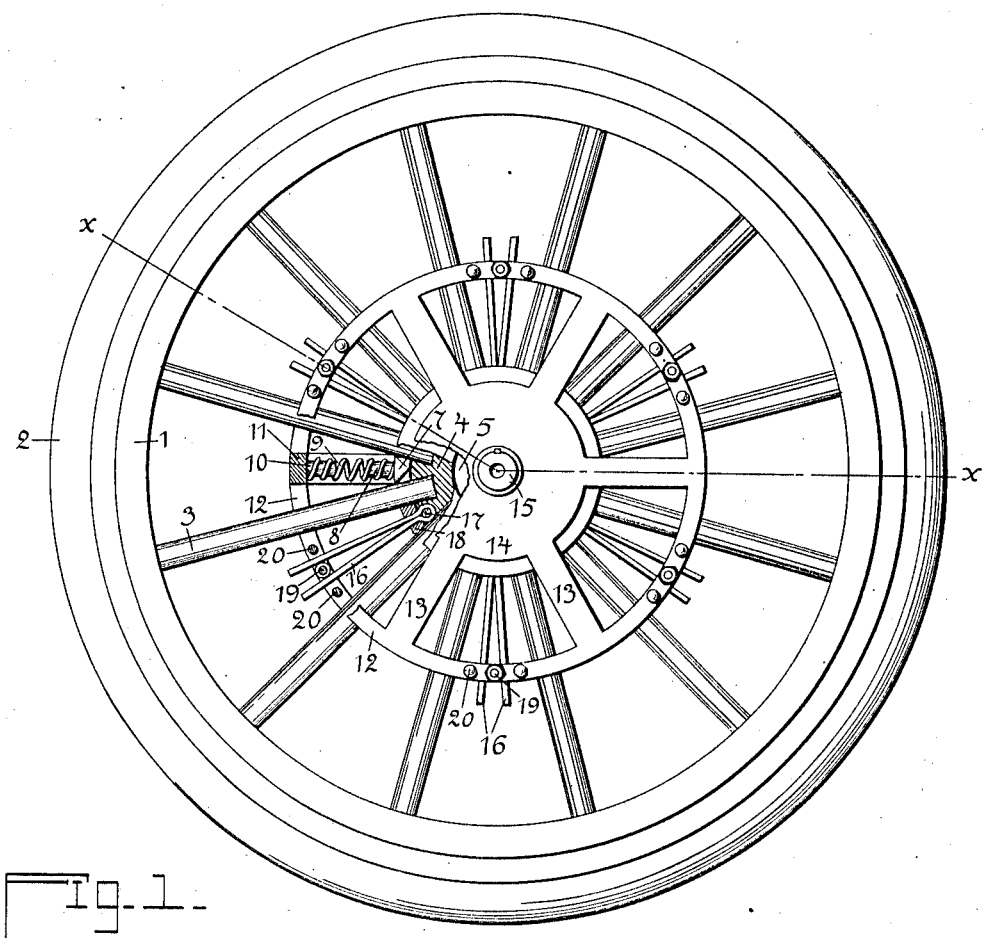
Figure 2:
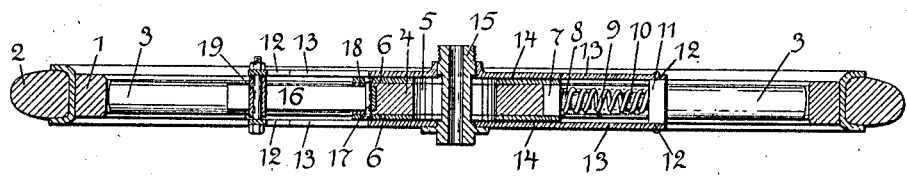

With these objects in view our invention has relation to certain novel features of the construction and operation, an example of which is described in the following specification, and illustrated in the accompanying drawing, wherein:

Figure 1 is a side elevation of the wheel with certain parts thereof broken away to more clearly reveal the construction. Fig. 2 is a view of the wheel in cross-section, the sectional plane being taken upon the line x—x of Fig. 1.

Referring now more particularly to the drawing wherein like numerals of reference designate similar parts in both the figures, the numeral 1 denotes the rim of the wheel, which may be given any suitable form, and which will preferably be provided with a solid rubber tire 2, in order to secure a tread of rounded cross-section, and that will have sufficient resiliency to eliminate the noise in travel that would be occasioned by a metallic tread or tire. A plurality of spokes 3 form a rigid connection between the rim and a large outer hub 4, provided with a central aperture 5. Circular plates 6 are secured rigidly against the hub 4 at each side thereof, said plates being provided with central apertures, which are alined with the aperture 5 of the hub. The diameter of the plate 6 is somewhat greater than that of the hub, and between the projecting outer portions of the plates are mounted a plurality of blocks 7, triangular in cross-section. These blocks will preferably be integral with one of the rings 6, and may be secured to one of the other rings by any suitable means. The outer surfaces of the blocks 7 are flush with the edges of the rings 6, and are curved to adapt them to the circular arcs formed by the edges of said rings. A pin or stud 8 projects radially from the curved outer surface of each block 7 and receives the inner extremity of a radial coiled spring 9. The outer extremities of the springs 9 are received by pins or studs 10, which extend inwardly from blocks 11, equidistantly mounted between rings 12, which are normally concentric with the rim of the wheel.

The rings 12 form the outer portions of a pair of apertured plates, the apertures being so arranged as to divide said plates into said rings 12, and a plurality of spokes 13 connecting said rings to a pair of inner circular plates or disks 14, one of which is mounted upon the inner hub 15 at each side thereof. The plates 14 are closely adjacent to the hub plates 6, and prevent lateral motion of the inner and outer hubs relative to each other, although they do not restrict a relative radial motion.

A plurality of radial flat springs 16 are employed to communicate rotation from the rim to the central hub, or from said hub to the rim, said springs being arranged in pairs, and each pair being preferably formed of a single steel bar. This bar is doubled upon itself at the center, a loop being formed at that point to receive a bolt or rivet 17, by which the springs 15 are secured between the plates 6. Blocks 18 are mounted between said plates at each side of the inner extremities of the spring, thus forming a very rigid connection between the springs and the plates 6. The members of each pair are slightly divergent, and their outer extremities bear upon each side of a bolt or rivet 19, mounted between the rings 12. A pair of bolts or rivets 20 are also mounted in the rings 12 adjacent to each pair of springs, being spaced slightly therefrom.

It is apparent from the above description that the herein described vehicle wheel may be considered to consist of two rigid frames, between which a resilient connection is established by the coiled springs 9, and the flat springs 16. The principal members of the outer frame are the rim 1, the spokes 3 and the outer hub 4. The inner frame is formed by the inner hub 15 and the members 12, 13 and 14, which are rigidly mounted upon said inner hub.

During the travel of a vehicle, upon which the herein described wheel is mounted, there will be a constant relative motion between the inner and the outer frames just mentioned. Each time that the rim portion of the wheel encounters an obstacle, or a rough place in the road, the shock or jar thus occasioned will be very much mitigated and decreased as it is communicated through the radial springs 9 to the central hub of the wheel, which receives the vehicle axle. Thus in traveling over a bad road the outer frame of the wheel may be in a constant state of vibration due to the inequalities encountered, while the vehicle itself will be comparatively unaffected, since the coiled springs will absorb the various shocks before they may reach the axle of the vehicle through the central hub.

The springs 9 are seated upon pairs of opposite pins 8 and 10 instead of upon continuous rods for the purpose of permitting a lateral play in said coiled springs. Rigid rods would not permit the necessary relative displacement, which must take place between pins 9 and 10 when they are in a horizontal position or approximately horizontal.

When rotation is communicated to the wheel from the vehicle axle, as in the case of the rear wheels of an automobile, this rotation will first tend to impart itself to the outer frame of wheel through the action of the bolt 19 upon one member of each pair of the springs 16. As rotative force is increased one of the bolts 20 will come into contact with the other member of each pair of springs 16, so that all of the springs 16 will be in action during the travel of a vehicle to communicate rotation from the inner to the outer frame or vice-versa.

By means of the above described construction, the same results are achieved, which are at present accomplished by means of pneumatic tires. A much greater durability is obtained, however, than can be secured from pneumatic tires, and the first cost and expense of operation are also materially reduced.

What we claim is:

1. In a vehicle wheel, the combination with a rigid frame, consisting of a rim and spokes and an outer hub, of a rigid frame consisting of an inner hub spaced from the outer hub, and a pair of circular apertured plates mounted upon each extremity of the inner hub, radially mounted coiled springs having their inner extremities seated upon the outer hub, and their outer extremities mounted between the outer portions of said apertured plates, the middle portions of said springs being adapted to undergo lateral displacement, and a plurality of flat radial springs having their inner extremities rigidly mounted in the outer hub, and having their outer extremities engaged by the outer portions of said apertured circular plates.

2. In a vehicle wheel, the combination with the rim and spokes, and an outer hub rigidly receiving the inner extremities of the spokes, of an inner hub spaced from the outer hub, an apertured circular plate mounted upon each extremity of the inner hub, a plurality of blocks rigidly mounted at equal distances between the outer portions of said plates, a pin projecting inwardly from each block, pins mounted upon the outer hub opposite to the last named pins, and a plurality of radially mounted coiled springs, having their extremities secured upon said pins.

3. In a vehicle wheel, the combination with a rim and spokes, and an outer hub rigidly receiving the inner extremities of the spokes, of an inner hub spaced from the outer hub, an apertured circular plate rigidly mounted upon each extremity of the inner hub, a plurality of blocks rigidly mounted between the outer portions of said plates at equal distances, a radial pin projecting inwardly from each block, a plurality of pins projecting radially from the outer hub and oppositely positioned to the pins just mentioned, a plurality of radial coiled springs having their extremities seated upon said pins, a plurality of flat radial springs projecting in pairs from the outer hub, and means carried by the outer portions of said plates engaging the outer extremities of said flat springs.

4. In a vehicle wheel, the combination with a rim and spokes, and an outer hub receiving the inner extremities of the spokes, of an inner hub spaced from the outer hub, a pair of circular plates rigidly attached to the outer hub at each side thereof, and provided with central apertures alined with the aperture of the hub, a plurality of blocks mounted between the outer portions of said plates, a pin projecting radially outward from each block, a plurality of radially mounted coiled springs having their inner extremities seated upon said pins, a pair of apertured circular plates rigidly mounted upon the extremities of the inner hub, and contacting with the plates mounted upon the outer hub, a plurality of blocks rigidly mounted at equal distances between the outer portions of said apertured circular plates, a pin projecting rigidly inward from each of the last named blocks, and receiving the outer extremity of one of said coiled springs, and a plurality of flat springs projecting radially in pairs from the outer hub, and means carried between the outer portions of the apertured circular plates engaging the outer extremities of the last named springs.

In testimony whereof we have signed our names to this specification in the presence of two subscribing witnesses.

ALFRED R. WYLIE.
JAMES G. WRIGHT.

Witnesses:
S. H. MORRISON,
S. B. FLETCHER.

Copies of this patent may be obtained for five cents each, by addressing the "Commissioner of Patents, Washington, D. C."